United States Patent
Lutze et al.

(10) Patent No.: US 10,960,494 B2
(45) Date of Patent: Mar. 30, 2021

(54) METHOD AND DEVICE FOR PRODUCING A TEAR LINE IN A PLANAR WORKPIECE ALONG A PREDETERMINED CONTOUR BY MATERIAL REMOVAL BY MEANS OF A LASER

(71) Applicant: JENOPTIK Automatisierungstechnik GmbH, Jena (DE)

(72) Inventors: Walter Lutze, Jena (DE); Martin Griebel, Jena (DE); Jurgen Weisser, Jena (DE); Frank Seidel, Buergel (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 420 days.

(21) Appl. No.: 15/808,503

(22) Filed: Nov. 9, 2017

(65) Prior Publication Data

US 2018/0133841 A1 May 17, 2018

(30) Foreign Application Priority Data

Nov. 11, 2016 (DE) .......................... 102016121644.5

(51) Int. Cl.
| | |
|---|---|
| *B23K 26/364* | (2014.01) |
| *B23K 26/359* | (2014.01) |
| *B23K 26/03* | (2006.01) |
| *B23K 26/0622* | (2014.01) |
| *B23K 26/082* | (2014.01) |
| *B23K 26/06* | (2014.01) |
| *B23K 103/00* | (2006.01) |

(52) U.S. Cl.
CPC .......... *B23K 26/364* (2015.10); *B23K 26/032* (2013.01); *B23K 26/0622* (2015.10);
(Continued)

(58) Field of Classification Search
CPC . B23K 26/0622; B23K 26/364; B23K 26/359
(Continued)

(56) References Cited

U.S. PATENT DOCUMENTS

| | | | | |
|---|---|---|---|---|
| 5,882,572 A | * | 3/1999 | Lutze ................... | B23K 26/009 219/121.71 |
| 2008/0290075 A1 | * | 11/2008 | Wittenbecher ....... | B23K 26/032 219/121.7 |

(Continued)

FOREIGN PATENT DOCUMENTS

| | | |
|---|---|---|
| DE | 101 44 628 A1 | 4/2003 |
| DE | 10 2007 024 510 B3 | 9/2008 |

(Continued)

*Primary Examiner* — Francisco W Tschen
*Assistant Examiner* — Edgaredmanuel Troche
(74) *Attorney, Agent, or Firm* — Duane Morris LLP

(57) ABSTRACT

A method and device for producing a tear line on a planar workpiece by material removal by means of a pulsed laser, wherein machining cycles are preceded by a method step for generating and storing a reference signal curve which is formed by reference signals, causing the pulse amplitude of the laser pulses, via removal locations along the contour of the tear line. The achievement of a respective predetermined percentage of the reference signal or of an absolute distance from the reference signal by a measurement signal is used as the space-resolved deactivation criterion for each removal location, which measurement signal is obtained from a transmitted part of the pulse amplitude at the respective removal location.

6 Claims, 2 Drawing Sheets

(52) U.S. Cl.
CPC ........ *B23K 26/0626* (2013.01); *B23K 26/082* (2015.10); *B23K 26/359* (2015.10); *B23K 2103/34* (2018.08); *B23K 2103/38* (2018.08)

(58) Field of Classification Search
USPC ................................................ 264/400, 1.37
See application file for complete search history.

(56) References Cited

U.S. PATENT DOCUMENTS

| | | | | |
|---|---|---|---|---|
| 2009/0321397 | A1* | 12/2009 | Krishnaswami ... | B23K 26/0838 219/121.68 |
| 2015/0352670 | A1* | 12/2015 | Lutze .................. | B23K 26/082 264/400 |
| 2016/0067821 | A1* | 3/2016 | Lutze .................. | B23K 26/364 219/121.69 |

FOREIGN PATENT DOCUMENTS

| | | |
|---|---|---|
| DE | 10 2013 104 138 B3 | 3/2014 |
| DE | 10 2014 108 133 B4 | 3/2016 |
| EP | 0 827 802 B1 | 5/2000 |
| EP | 0 991 551 B1 | 10/2001 |
| EP | 2 962 800 A2 | 1/2016 |

\* cited by examiner

1st machining cycle n-th machining cycle

METHOD AND DEVICE FOR PRODUCING A TEAR LINE IN A PLANAR WORKPIECE ALONG A PREDETERMINED CONTOUR BY MATERIAL REMOVAL BY MEANS OF A LASER

RELATED APPLICATIONS

The present application claims priority benefit of German Application No. DE 10 2016 121 644.5 filed on Nov. 11, 2016, the contents of which are incorporated by reference in its entirety.

FIELD OF THE INVENTION

The invention relates to a method and a device for producing a tear line in a planar workpiece along a predetermined contour, said contour describing a sequence of removal locations.

BACKGROUND OF THE INVENTION

It is common nowadays, in many fields of application, to introduce integrated tear lines into planar workpieces so as to open them along said tear line if necessary. Examples include tearing and separating aids in packaging materials, medical auxiliary materials, stationery or safety clothing. Particularly high quality requirements apply to tear lines in airbag covers which, on the one hand, should not be visible and, on the other hand, allow the airbag to penetrate unhindered when activated.

Due to this particularity, the prior art with respect to methods for producing tear lines is described almost exclusively with reference to airbag covers. Therefore, the description of the method disclosed herein will also be explained with reference to an airbag cover or a component of an airbag cover, respectively.

In high-quality embodiments of airbag covers, a stable, shaping layer is often provided with further layers constituting covering materials by which the surface of the cover element facing the passenger compartment is optically and haptically improved. These covering materials are usually foam materials forming an intermediate layer or spacer fabrics as well as flexible and thin-walled materials serving as a decorative layer, such as plastic sheets, leatherette, textile fabrics, microfibre nonwovens or natural leather. In order to ensure safe deployment of the airbag, tear lines are usually introduced not only into the shaping layer but also into the covering materials. The tear lines can be introduced along a contour in the final layer structure or into the individual layers prior to mounting them. Any mention made hereinafter of planar workpieces may refer to either a single layer or a layer structure.

A great number of methods are known from the prior art by which tear lines are introduced by means of a laser either into the final layer structure of an airbag cover or into individual layers (components) which are subsequently assembled to form a layer structure.

DE 10 2013 104 138 B3 describes a method for introducing a defined tear line into a covering material by material removal, wherein the linear guidance of a pulsed laser beam consists in multiple repetitions of a scanning movement along the line formed by removal locations, emitting only one laser pulse per removal location. In this case, the parameters of the laser pulse are selected such that the laser pulse causes an energy input which leads to heating of the covering material at the respective removal location to a temperature above an ablation threshold and, thus, to material removal, while keeping the temperature in regions of the covering material adjacent to the respective removal location below a limit temperature that would lead to changes in the structure of the covering material.

The multiple repetitions of the scanning movement can be performed until a low residual wall thickness is achieved at which an array of sensors below the tear line then detects the transmitted laser radiation. Achieving the minimum allowable residual wall thickness in any single removal location causes space-resolved deactivation of the laser beam during the scanning movement. The achievement of the minimum allowed residual wall thickness is determined by detection of a predetermined amount of transmitted laser power.

To ensure that only one laser pulse impinges per removal location, the speed of the scanning movement and the pulse repetition frequency of the pulsed laser beam are adjusted to each other.

As an alternative to a pulsed laser beam, a continuous laser beam may be used, which is advantageously switched on and off according to a fixed regime during the repeated scanning movement, with the tear line introduced along the line having the shape of a slot-bridge line with an alternating sequence of slots and bridges.

By detecting the achievement of a minimum residual wall thickness per removal location and performing a corresponding space-resolved deactivation, a tear line can be produced which exhibits constant tear strength over its entire length, regardless of variations in material thickness. In this case, the tear resistance level can be adjusted not only via the remaining residual wall thickness, but also via the number of removal locations or the number of perforations formed, respectively, which penetrate the material up to a residual wall, and their spacing or bridge lengths, respectively.

In a method disclosed in patent EP 0 991 551 B1, a tear line is also produced by forming a sequence consisting of a plurality of sequentially produced perforations by means of a pulsed laser beam in an airbag cover. The perforations may be introduced either overlapping each other or spaced apart by residual bridges. The perforations are completed as soon as transmission of the laser radiation is detected. In addition to perforations, tear lines, sections in the tear line or individual holes can also be produced without fully perforating the material. The depth of such non-perforating weakening can be estimated and adjusted on the basis of the pulse number and/or pulse duration required to produce a perforation. The patent does not disclose any details on the adjustment of said depth.

A method known from DE 10 2014 108 133 B4 differs from the present method in that, in an alternating manner, a higher energy input is effected into first segments of the tear line than into second segments and the transmitted laser radiation causes signals to pass through the residual walls of the first segment from which conclusions are drawn as to the thickness of the residual walls of the second segments without detection.

The aforementioned methods all have in common that the removal along the contour of the tear line to be produced is effected by means of a laser, with material being removed, thereby reducing the remaining residual wall below the respective removal location. Depending on the transmittance of the material, laser radiation power is transmitted through the residual wall as soon as the latter is below a certain thickness. The transmitted laser radiation power of a laser pulse is detected when it is above a lower limit of the sensitivity range of the sensor, so that the latter generates a signal. For materials with very low transmittance, this will occur just before the complete breakthrough or not until a microhole forms. In materials with comparatively high transmittance, a signal may even be generated when the residual wall thickness is still too high. In this case, a threshold value for the signal may be found by a prior test correlating with a desired thickness of the residual wall.

It may be assumed that in the aforementioned methods the obtained signal serves directly as a deactivation criterion for the laser.

A method is known from EP 0 827 802 B1 wherein the obtained signals of a sensor are upwardly integrated and the integral value thus formed is compared as a deactivation criterion with a target value correlating with the desired residual wall thickness. In this case, however, the tear line is produced by sequentially completing the blind holes forming a tear line. Forming the integral value is to enable the creation of a deactivation criterion which takes into account, in particular, combustion residues and evaporation gases generated when forming the blind holes.

DE 10 2007 024 510 B3 discloses a method for producing a tear line by material removal on a planar workpiece, wherein a laser beam is guided along a predetermined contour of a tear line. In this case, a material removal per removal location is generated to a predetermined residual wall thickness in each case. In order to achieve a high-precision residual wall thickness, reference measurement values are obtained therein by means of sensors, through measurement or test machining of reference workpieces, respectively, and are stored, assigned to the respective machining locations.

OBJECT OF THE INVENTION

It is an object of the invention to improve a method for producing a tear line in a planar workpiece by means of a laser, wherein the transmitted laser radiation is detected at removal locations along the contour of the tear line by an array of sensors. It is also an object of the invention to find a device by which the improved method for the production of diverse contours of tear lines can be applied.

This object is achieved by a method for producing a tear line by material removal on a planar workpiece. For the sake of a clear description, the planar workpiece has a visible side and a reverse side opposite the visible side. This terminology results from a typical use of such a workpiece as an airbag cover. In order to carry out the method, a pulsed laser beam is generated by a laser generator, said beam having laser pulses of an energy determined by a pulse amplitude and a pulse length. The laser pulses are each introduced sequentially, in machining cycles repeated multiple times, along a predetermined contour for the tear line at a respective removal location from the reverse side in each case. Material removal is effected for each removal location to a predetermined residual wall thickness in each case, which may even be zero. In this case, when a deactivation criterion for the respective predetermined residual wall thickness is reached, the introduction of laser pulses is terminated in a space-resolved manner with respect to the removal locations. For each machining cycle, a measurement signal curve is generated, which is formed by measurement signals via the removal locations, each of them caused by detection of a transmitted part of the pulse amplitude of one of the laser pulses by means of at least one sensor of an array of sensors per removal location. If the transmitted part of the pulse amplitude in any of the removal locations is below a lower limit threshold of the sensitivity range of the sensors or if no part of the pulse amplitude is transmitted, no measurement signal is generated for the respective removal location.

It is essential to the invention that the machining cycles are temporally preceded by a method step of generating and storing a reference signal curve. The latter is formed by reference signals causing the pulse amplitude via the removal locations, with no workpiece being present in this method step between the laser generator and the array of sensors. In the temporally preceding method step as well as the machining cycles, the pulse amplitude of the laser pulses is kept constant. As the space-resolved deactivation criterion for each removal location, the achievement of a respective predetermined percentage of the reference signal or of a predetermined absolute distance from the reference signal by the measurement signal is used in each case.

Particularly advantageously, the laser pulses have a shorter pulse length during the first of the machining cycles than during the subsequent machining cycles, so that the energy of the laser pulses is so low that no material removal results. This prevents still existing residual material being further reduced or removed entirely at removal locations where the deactivation criterion has already been achieved.

If a measurement signal equal to the reference signal is already generated in the first machining cycle for some of the removal locations, no further laser pulses will be introduced at these removal locations in the subsequent machining cycles.

If a measurement signal is already generated for some of the removal locations in the first machining cycle which is greater than the respectively predetermined percentage of the respective reference signal, or if the distance of said measurement signal from the reference signal is smaller than the predetermined distance from the reference signal, no laser pulses will be introduced at these removal locations in the subsequent machining cycles.

Advantageously, a measurement signal is generated for some of the removal locations in one of the machining cycles which is smaller than the respectively predetermined percentage of the respective reference signal or whose distance from the reference signal is smaller than the predetermined distance from the reference signal, and laser pulses with a shorter pulse length than those introduced at the removal locations for which no measurement signal has been generated yet in this one machining cycle are introduced at said removal locations in the subsequent machining cycles.

Advantageously, the temporally preceding method step is carried out only once for machining workpieces of the same type with the same contour for the tear line and is then used for producing the tear line in the further workpieces of the same type.

The object of the invention is achieved by a method for producing a tear line by material removal on a planar workpiece having a visible side and a reverse side opposite the visible side. The device comprises a laser generator, which emits a pulsed laser beam with laser pulses having a pulse amplitude, a laser scanner which directs the laser pulses within a work field at removal locations along a predetermined contour for the tear line onto the reverse side of the planar workpiece, and an array of sensors which are present on the visible side. The sensors are distributed over the work field, preferably arranged in the form of a matrix, and each have an aperture angle sufficiently large for at least one of the sensors to detect a transmitted part of the pulse amplitude at any removal location within the work field, so that the device can be used for any tear line contours located within the work field.

The invention will be explained in more detail below with reference to exemplary embodiments and associated drawings.

DESCRIPTION OF THE EMBODIMENTS

Figure 1:
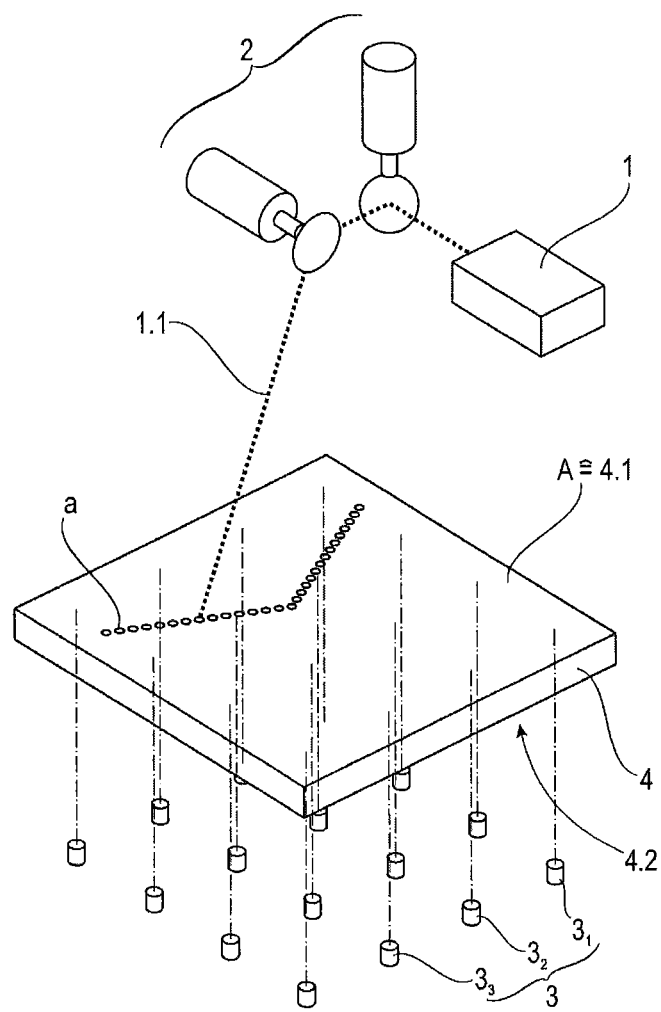
FIG. 1 shows a device for carrying out the method of the invention.

FIG. 1 shows a schematic diagram of a device according to the invention.

The device includes a laser generator 1 which emits laser pulses 1.1 with a pulse amplitude (pulsed laser beam), a laser scanner 2 which guides the laser pulses 1.1 within a work field A to removal locations $a_1, \ldots, a_n$, and an array of sensors 3 in which sensors $3_1, \ldots, 3_m$ are arranged in the form of a matrix below the work field A and each have an aperture angle sufficiently large for at least one of the sensors $3_1, \ldots, 3_m$ to detect the pulse amplitude or part of the pulse amplitude of a laser pulse 1.1 impinging on any of the removal locations $a_1, \ldots, a_n$ within the work field A. The specific design and arrangement of the sensors 3 allows a transmitted part of the pulse amplitude to be detected from any point within the work field A and, thus, at any removal location $a_1, \ldots, a_n$ so that this device can be used without having to be configured for a specific tear line contour. In order to record a reference signal curve $f(R_a)$ according to the invention, the device is operated without insertion of a workpiece 4, with the laser scanner 2 being controlled such that the laser pulses 1.1 impinge on removal locations $a_1, \ldots, a_n$ along a predetermined contour of a tear line.

For machining, a planar workpiece 4, which has a reverse side 4.1 and a visible side 4.2, is arranged in the device such that its reverse side 4.1 coincides with the work field A and its visible side 4.2 faces the array of sensors 3.

As in the prior art, the material removal for producing a tear line in a planar workpiece 4 is generally effected by a laser beam directing laser pulses 1.1 onto the reverse side 4.1 of the planar workpiece 4 and being guided several times, i.e. in several machining cycles, along a predetermined contour for the tear line over the planar workpiece 4, advantageously by means of a laser scanner 2. In this case, the laser pulse 1.1 impinging on each respective removal location $a_1, \ldots, a_n$ causes an energy input which leads to ablation of the material of the planar workpiece 4 at the respective removal locations $a_1, \ldots, a_n$.

The multiple repetition of the scanning movement occurs until a respectively desired residual wall thickness, which may even be zero, has been achieved for all removal locations $a_1, \ldots, a_n$. The laser generator 1 generating the laser pulses 1.1 is controlled such that laser pulses 1.1 impinge on the removal locations $a_1, \ldots, a_n$ only until the desired residual wall thickness has been achieved, i.e. space-resolved deactivation of the laser beam occurs during the scanning movement. The deactivation criterion is generated as a function of a part of the pulse amplitude of the laser pulse 1.1 transmitting at the respective removal location $a_1, \ldots, a_n$. For this purpose, the array of sensors 3 is arranged on the visible side 4.2 of the planar workpiece 4, opposite the action of the laser beam. This is as far as the method is known from the prior art.

The method according to the invention is novel insofar as it obtains a deactivation criterion which correlates with the respectively desired residual wall thickness. Obtaining the deactivation criterion according to the invention results in a narrower tolerance of the residual wall thickness, spatially resolved via the removal locations $a_1, \ldots, a_n$ along the contour, and thus in a reproducible tearing behaviour of the tear line.

Due to the deactivation criterion being obtained by a comparison between a space-resolved reference signal curve $f(R_a)$ and measurement signal curves $f_1(M_a), \ldots, f_n(M_a)$, there is no need to adapt the arrangement of the sensors 3 to the contour of the tear line. This makes it possible, using a device which comprises a fixed array of sensors 3, to produce workpieces 4 with different contours or workpieces 4 with identical contours located at different relative positions within the work field A.

For this purpose, the method is changed as follows:

The above-described machining cycles, wherein for each laser pulse 1.1 a material removal generally occurs at one of the removal locations $a_1, \ldots, a_n$, are temporally preceded by a method step wherein a reference signal curve $f(R_a)$ is formed from reference signals $R_a$, e. g. in the form of a voltage, resulting from the pulse amplitudes, via the removal locations $a_1, \ldots, a_n$ and is stored. For this purpose, the laser beam is guided once along the contour of the tear line, emitting one laser pulse 1.1 per removal location $a_1, \ldots, a_n$. However, there is no workpiece 4 in the work field A above the array of sensors 3. The sensitivity of the sensors $3_1, \ldots, 3_m$ is adjusted, e. g. by means of attenuators, such that the pulse amplitude of the laser pulses 1.1 is within the dynamic range of the sensors $3_1, \ldots, 3_m$. Depending on the position of any one of the removal locations $a_n$ with respect to the sensors $3_1, \ldots, 3_m$, either one of the sensors $3_1, \ldots, 3_m$ or several of the sensors $3_1, \ldots, 3_m$ will detect the pulse amplitude or parts of the pulse amplitude of the laser pulse 1.1, from which a reference signal $R_a$ is formed.

For the sake of simplicity, reference shall be made hereinafter to a reference signal or a measurement signal $R_a$ or $M_a$, respectively, regardless of whether only a single one of the sensors $3_1, \ldots, 3_m$ detects the pulse amplitude or a part of the pulse amplitude and a single reference signal or measurement signal $R_a$ or $M_a$, respectively, is derived therefrom, or whether several of the sensors $3_1, \ldots, 3_m$ respectively detect a part of the pulse amplitude, from which several individual reference signals or measurement signals $R_a$ or $M_a$, respectively, are derived, which are used to form a total reference signal or a total measurement signal, e.g. by addition, an OR link or averaging.

The sensors $3_1, \ldots, 3_m$ are usually arranged in correlation with the contour of the tear line. In connection with carrying out the method according to the invention, however, they are advantageously arranged in the form of a matrix, covering a work field A over which the laser beam can be generally guided, so that different contours of tear lines located within the work field A can be produced by the same configuration of the array of sensors 3.

If a laser scanner 2 is used to guide the laser beam, the impingement angle of the laser beam changes according to the position of the current removal location $a_1, \ldots, a_n$ in the work field A from 0° at the centre to approx. 20° at the edges. This results, for each contour of a tear line in the work field A, in an individual irradiation direction for the removal locations and, thus, for the sensors $3_1, \ldots, 3_m$ and in individual distances of the removal locations $a_1, \ldots, a_n$, from the nearest sensor centres. Depending on the respective aperture angle of the sensors $3_1, \ldots, 3_m$, for signal detection, and on the distance of the sensors $3_1, \ldots, 3_m$ from each other, a reference signal $R_a$ results for each removal location $a_1, \ldots, a_n$ that may differ according to the respective distance of the removal locations $a_1, \ldots, a_n$ from the sensors $3_1, \ldots, 3_m$ and the impingement angle of the laser beam, because the sensors' sensitivity decreases as the distance from the sensor centre increases.

The reference signals $R_a$ are stored as signals assigned to the individual removal locations $a_1, \ldots, a_n$.

This method step, which precedes the machining cycles, has to be repeated in order to machine workpieces 4 with different contours for the tear line. When machining workpieces 4 with the same contour of the tear line, which also have the same relative position with respect to the sensors $3_1, \ldots, 3_m$ of the array of sensors 3, the reference signal curve $f(R_a)$ stored once can be used.

In each of the subsequent machining cycles, a respective measurement signal curve $f_1(M_a), \ldots, f_n(M_a)$ is formed and compared to the reference signal curve $f(R_a)$. The measurement signals $M_a$ are each caused by a transmitted part of the pulse amplitude of a laser pulse 1.1 and are detected and stored e.g. in the form of a voltage assigned to the removal locations $a_1, \ldots, a_n$.

The laser pulses 1.1 have the same unchanged pulse amplitude both in the preceding method step and in the machining cycles. Whether material removal takes place and how much material, if any, is removed per laser pulse 1.1 at any of the removal locations $a_1, \ldots, a_n$ is controlled via the pulse length. If it is to be expected, due to the properties of the planar workpiece 4, that measurement signals $M_a$ are formed already in the first machining cycle, and their level corresponds exactly or approximately to the reference signal $R_a$, the pulse length of the laser pulses 1.1 is advantageously selected to be shorter in this first machining cycle than in the subsequent machining cycles so as to reduce the energy input to the extent that no material removal occurs yet.

Such workpieces 4 may be tissues or fabrics with a perforated structure, so that the laser pulses 1.1 can already pass through the workpiece 4 unhindered at some of the removal locations $a_1, \ldots, a_n$ without prior material removal. The method is generally applicable to any workpiece 4, regardless of whether measurement signals $M_a$ are detected in a first machining cycle for all removal locations $a_1, \ldots, a_n$ for some of the removal locations $a_1, \ldots, a_n$ or for none of the removal locations $a_1, \ldots, a_n$. What is decisive is that the deactivation criterion used for the individual removal locations $a_1, \ldots, a_n$ is in each case a predetermined percentage of the reference signal $R_a$ or an absolute distance from the reference signal $R_a$ and machining is terminated at the respective removal location $a_1, \ldots, a_n$ if a measurement signal $M_a$ is formed for the first time for said removal location $a_1, \ldots, a_n$ that is greater than or equal to the predetermined deactivation criterion. How large the percentage of the reference signal $R_a$ or the distance from the reference signal $R_a$ selected as the deactivation criterion depends on the material properties of the workpiece 4.

Figure 2:
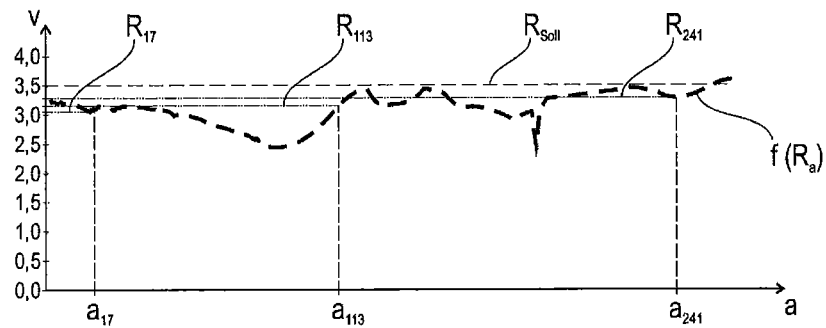
FIG. 2 shows a reference signal curve, formed by reference signals via the removal locations, during the absence of a workpiece above an array of sensors.
Figure 3:
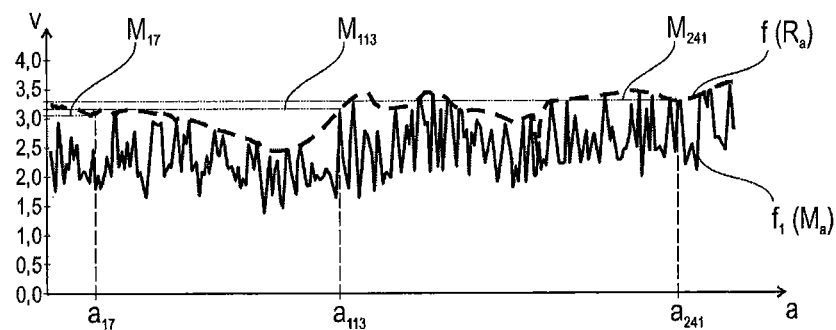
FIG. 3 shows a first measurement signal curve, formed by measurement signals via the removal locations, while an unprocessed workpiece is present above the array of sensors.
Figure 4:
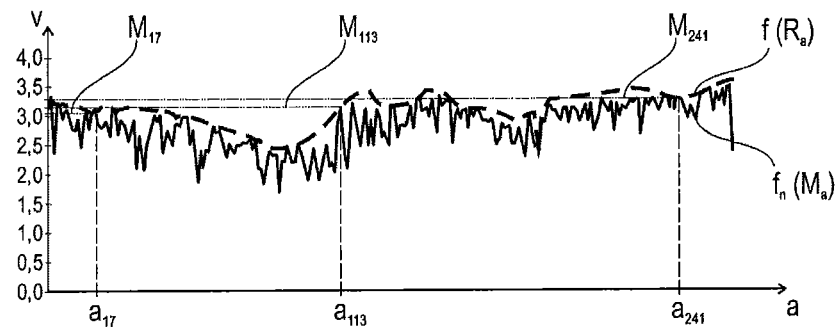
FIG. 4 shows an n-th measurement signal curve, formed by measurement signals via the removal locations, while the workpiece is being machined in the n-th machining cycle.

FIGS. 2 to 4 show a reference signal curve $f(R_a)$ and first and n-th measurement signal curves $f_1(M_a), f_n(M_a)$. In this case, a transparent workpiece 4 was machined, so that even without any material removal at all of the removal locations $a_1, \ldots, a_n$ via the contour of the tear line to be introduced, a part of the pulse amplitude of the respectively impinging laser pulse 1.1 is transmitted.

FIG. 2 shows a reference signal curve $f(R_a)$ resulting from the individual reference signals $R_a$ that are each assigned to one of the removal locations $a_1, \ldots, a_n$. The reference signals $R_a$ deviate more or less from a theoretical target value $R_{soll}$.

FIG. 3 shows a first measurement signal curve $f_1(M_a)$ resulting from the individual measurement signals $M_a$ that are each assigned to one of the removal locations $a_1, \ldots, a_n$ during the first machining cycle. The measurement signals $M_a$ deviate more or less from the respective reference signals $R_a$ or correspond to the reference signal $R_a$ at some of the removal locations $a_1, \ldots, a_n$. In the latter case, no further laser pulse 1.1 is introduced at any of these removal locations $a_1, \ldots, a_n$ in the further machining cycles.

FIG. 4 shows a further, n-th measurement signal curve $f_n(M_a)$. The n-th measurement signal curve $f_n(M_a)$ has visibly approached the reference signal curve $f(R_a)$.

As an example, the machining will be explained at three different ones of the removal locations $a_1, \ldots, a_n$, for example three out of a total of e.g. 270 removal locations $a_1, \ldots, a_n$ (n=270) describing the contour of the tear line, namely $a_{17}$, $a_{113}$ and $a_{241}$.

At the removal location $a_{17}$, the measurement signal $M_{17}$ is still a great distance away from the reference signal $R_{17}$ during the first machining cycle, while its distance in the n-th machining cycle is only marginal and machining has been terminated for this removal location $a_{17}$. The situation is similar at removal location $a_{113}$, where machining was terminated earlier. At removal location $a_{241}$, a measurement signal $M_{241}$ which corresponds to the reference signal $R_{241}$ or which meets the deactivation criterion was generated already in the first machining cycle, so that advantageously no removal takes place, which is feasible by working with such a short pulse length in the first machining cycle that the energy input by a laser pulse 1.1 is below a threshold for material removal.

A transparent planar workpiece 4 may be, for example, a tissue, wherein the removal locations $a_1, \ldots, a_n$, simply spoken, are located either on a woven thread, a junction of woven threads or a hole bordered by woven threads, which means there are three groups of removal locations $a_1, \ldots, a_n$ through which different-sized parts of the pulse amplitude are transmitted. Such workpieces 4 may also be fabrics, wherein removal locations $a_1, \ldots, a_n$ differing in transparency result in the same manner as in a tissue.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE NUMERALS 1 laser generator
1.1 laser pulse
2 laser scanner
3 Array of sensors $3_1, \ldots, 3_m$
$3_1, \ldots, 3_m$ sensor (of the array of sensors $3_1, \ldots, 3_m$)

4 workpiece
4.1 reverse side
4.2 visible side
A work field
$a_1, \ldots, a_n$ removal location
$f(R_a)$ reference signal curve
$f_1(M_a)$ first measurement signal curve
$f_n(M_a)$ n-th measurement signal curve
$M_a$ measurement signal
$R_a$ reference signal
$R_{soll}$ target value

What is claimed is:

1. A method for producing a tear line on a planar workpiece by material removal, said planar workpiece having a visible side and a reverse side opposite said visible side, comprising:

generating a pulsed laser beam from a laser generator, said pulsed laser beam having pulses of an energy determined by a pulse amplitude and a pulse length;

introducing said pulses sequentially, in machining cycles repeated more than once, along a predetermined contour for the tear line at a respective removal location from the reverse side of said workpiece, wherein material removal is performed for each removal location to a respective predetermined residual wall thickness, wherein said wall thickness may be zero;

terminating, upon reaching a deactivation criterion correlating with the respective predetermined residual wall thickness, the introduction of the laser pulses in a space-resolved manner with respect to the removal locations, generating a measurement signal curve for each machining cycle, which is formed by measurement signals via the removal locations, which are each caused by detection of a transmitted part of the pulse amplitude of one of the laser pulses by means of at least one sensor of an array of sensors for each removal location;

generating and storing a reference signal curve as a step temporally preceding said machine cycles, said reference signal curve being formed by reference signals causing the pulse amplitude via the removal locations with no planar workpiece being arranged between the laser generator and the array of sensors, the pulse amplitude of the laser pulses being kept constant in the steps of generating and storing said reference signal curve temporally preceding said machining cycles as well as in the machining cycles, and the achievement of a respective predetermined percentage of the reference signal or of a predetermined distance from the reference signal by the measurement signal being used as the space-resolved deactivation criterion for each removal location.

2. The method according to claim 1, wherein said laser pulses have a shorter pulse length during a first one of the machining cycles than during subsequent ones of the machining cycles, so that the energy of the laser pulses is so low that no material removal results.

3. The method according to claim 2, wherein a measurement signal equal to the reference signal is already generated for some of the removal locations in the first machining cycle, and no further laser pulses are introduced at these removal locations in subsequent machining cycles.

4. The method according to claim 2, wherein a measurement signal which is greater than the respective predetermined percentage of the respective reference signal or whose distance from the reference signal is smaller than the predetermined distance from the reference signal is already generated for some of the removal locations in the first machining cycle, and no further laser pulses are introduced at these ones of the removal locations in subsequent machining cycles.

5. The method according to claim 2, wherein a measurement signal which is smaller than the respective predetermined percentage of the respective reference signal or whose distance from the reference signal is smaller than the predetermined distance from the reference signal is generated for some of the removal locations in one of the machining cycles, and in subsequent machining cycles laser pulses are introduced at these ones of the removal locations with a shorter pulse length than those introduced at the removal locations for which no measurement signal has been formed yet in this one machining cycle.

6. The method according to claim 1, wherein the step temporally preceding said machining cycles is carried out only once for machining workpieces of the same type with the same contour for the tear line and is then used for producing the tear line in further workpieces of the same type.

* * * * *